United States Patent

[11] 3,622,084

[72] Inventor Joseph Ross
New Martinsville, W. Va.
[21] Appl. No. 858,254
[22] Filed Sept. 10, 1969
[45] Patented Nov. 23, 1971
[73] Assignee PPG Industries, Inc.
Pittsburgh, Pa.

[54] FLUID ENERGY STEAM MILL COLLECTION SYSTEM
11 Claims, 2 Drawing Figs.

[52] U.S. Cl. ................................................. 241/5,
241/19, 241/41
[51] Int. Cl. ............................................ B02c 19/06
[50] Field of Search ............................... 241/5, 39,
29, 18, 19, 41

[56] References Cited
UNITED STATES PATENTS

| | | | |
|---|---|---|---|
| 2,460,546 | 2/1949 | Stephanoff .................. | 241/5 UX |
| 2,494,153 | 1/1950 | Andrews ..................... | 241/5 |
| 2,552,603 | 5/1951 | Tanner ........................ | 241/5 |
| 3,317,145 | 5/1967 | Stephanoff .................. | 241/5 |
| 3,491,953 | 1/1970 | Stephanoff .................. | 241/39 |
| 3,531,310 | 9/1970 | Goodspeed .................. | 241/29 X |

*Primary Examiner*—Donald G. Kelly
*Attorney*—Chisholm and Spencer

ABSTRACT: Pigmentary properties of inorganic pigments, particularly pigmentary metal oxides such as titanium dioxide, are enhanced by fluid energy milling with steam. A dry collection system for the fluid energy mill gas discharge stream is proposed.

PATENTED NOV 23 1971

3,622,084

INVENTOR
JOSEPH ROSS

BY Chisholm and Spencer

ATTORNEYS 3,622,084

FLUID ENERGY STEAM MILL COLLECTION SYSTEM

BACKGROUND OF THE INVENTION

In the preparation of inorganic pigments and especially in the preparation of pigmentary metal oxides, such as titanium dioxide, various methods have been developed for enhancing such oxides' pigmentary properties for use in commercial applications, such as in paints. Included among such methods are calcination, hydroclassification, coating the surface of the pigment with hydrous metal oxides and/or organic coatings and milling. Milling is typically the last processing step which the pigment undergoes prior to packing and is typically a fluid energy milling.

In a fluid energy mill utilizing steam as the grinding medium, pigment and high-pressure steam, usually superheated steam, are introduced into a shallow circular grinding chamber wherein the pigment is acted upon by the high-pressure steam. The steam is generally introduced in a tangential direction in order to promote the rotation of the pigment in one direction. The centrifugal force of the rotation causes the pigment to concentrate at the periphery of the grinding chamber where the steam is introduced. At the point of introduction, intense local velocity gradients and intense interactions are set up within the pigment, thereby causing impingement of the pigment particles upon each other. The steam which supplies the grinding energy is withdrawn at an inward point tending to cause the pigment to travel spirally. The outlet from the grinding chamber typically leads directly into a concentric centrifugal collector. This collector is conducive to the separation of the pigment from the steam so that from 85 to 95 percent of the pigment is collected in the concentric collector. The steam is discharged from the mill carrying with it pigment not separated in the concentric collector, e.g. 5 to 15 percent of pigment product.

The pigment product withdrawn with the gas discharge from the fluid energy steam mill represents a significant quantity of pigment product and, therefore, must be recovered in order to produce a process with favorable economics. In the past, this pigment product has been collected by a wet collection scheme which requires significant processing and capital investment. Any improvement in the aforementioned wet collection system would, therefore, improve the economics of the process.

BRIEF SUMMARY OF THE INVENTION

It has now been discovered that pigment entrained in the principal gas discharge of a fluid energy steam mill can be collected by means of a dry collection system. In particular, it has been discovered that if the temperature of the gas discharge from a fluid energy steam mill is maintained above its dew point temperature, the pigment entrained in the gas discharge of the steam mill can be separated and collected by conventional dry collection equipment, e.g., dust collectors.

BRIEF DESCRIPTION OF THE DRAWINGS

The invention described herein can be more fully understood by reference to the accompanying drawings wherein.

DETAILED DESCRIPTION

Figure 1:
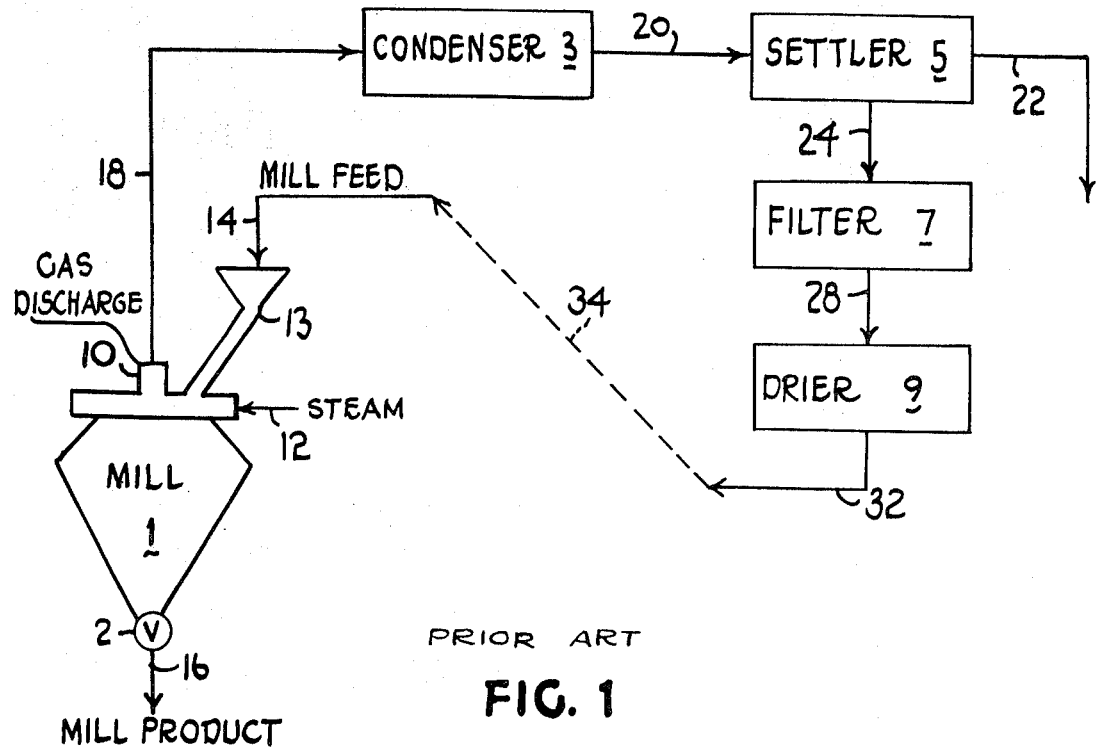
FIG. 1 is a schematic of a wet collection system for pigment entrained in the gas discharge from a fluid energy steam mill.

Inorganic pigments, particularly pigmentary metal oxides, such as titanium dioxide, are fluid energy milled utilizing steam to supply the grinding energy in order to develop and enhance the pigmentary properties of the pigment. While the present description will, for the sake of brevity, be directed to fluid energy milling of titanium dioxide, it is equally applicable to other inorganic pigments processed in the same manner. Examples of other pigmentary metal oxides to which the present invention can be applied are the pigmentary oxides of aluminum, arsenic, beryllium, boron, iron phosphorus, silicon, strontium, tantalum, thorium, tin, titanium, zinc, zirconium, antimony, lead and mercury.

Titanium dioxide pigment is produced commercially by at least two different commercial processes. One such process is known as the "sulfate" or "acid process". In the sulfate process, a titaniferous ore, such as ilmenite, is digested in sulfuric acid to form a digest cake. The cake is dissolved in an aqueous medium to form a sulfate solution which, after clarification and concentration, is hydrolyzed to precipitate an insoluble titanium dioxide hydrolysate. The hydrolysate is filtered, washed and calcined to develop the particular crystal structure desired.

Another more recent process for preparing titanium dioxide pigment involves the vapor phase reaction, e.g., oxidation or hydrolysis, of a titanium halide, particularly a titanium tetrahalide at elevated temperatures. In a typical vapor phase oxidation reaction, a titanium tetrahalide, particularly one selected from the group consisting of titanium tetrachloride, titanium tetrabromide and titanium tetraiodide, is oxidized at temperatures about 500° C., e.g., between 900° C. and 1,500° C., with an oxygen-containing gas. Titanium tetrafluoride is generally considered not useful for the vapor phase oxidation reaction. The aforementioned vapor phase oxidation of titanium tetrahalide, usually referred to as the "chloride process," is described in detail in U.S. Pat. No. 3,214,284. This patent is incorporated herein by reference, in toto, to eliminate the need to substantially reproduce a detailed description of such art recognized oxidation reaction.

Following preparation of titanium dioxide by any of the processes known in the art, the pigment is characteristically subjected to further processing steps, such as wet and dry grinding, hydroclassification and the application of hydrous metal oxide coatings to the surface of the pigment. The aforementioned coating typically involves placing one or more hydrous oxides of titanium, aluminum, silicon, magnesium, zirconium, tin, zinc, cerium, etc., on the surface of the pigment. A typical coating procedure is described in U.S. Pat. No. 3,146,119. This patent is also incorporated herein by reference, in toto, to eliminate the need to substantially reproduce a detailed description of such art recognized coating procedure. Generally, hydrous metal oxides of titanium, aluminum and silicon in various combinations are used.

In the case of titanium dioxide pigment, the amount of titania, silica and alumina, usually as hydrates, deposited on the surface of the pigment can vary respectively from 0.05 to 10 percent, 0.01 to 10 percent, and 0.05 to 15 percent. Other metal hydrates can be deposited in amounts of from about 0.01 to about 5 percent. The total amount of hydrous metal oxide coating placed on a pigment typically varies from about 2 to about 20 weight percent, based on the weight of the pigment.

Following application of the aforementioned hydrous metal oxide coating, the pigment is typically recovered from the aqueous coating media, dried and fluid energy milled. Such fluid energy milling or dry grinding, as it is commonly known, typically reduces the oil absorption and improves the the tinting strength and dispersion of the pigment. Dry grinding of the coated pigment is usually performed by simultaneously charging the pigment and superheated steam or air into a fluid energy mill.

A fluid energy mill is an apparatus in which pigment particles are conveyed by one or more streams produced by jets of milling fluid, such as air or steam, in such a manner so as to provide particle to particle collisions. For example, in a Micronizer, the jets of milling fluid are placed in a manner which will maintain an inwardly spiraling vortex at a high rotative speed and relatively small inward speed. As a result, the pigment particles conveyed by such milling fluid rub or strike against each other within the apparatus. The milling fluid supplying the grinding energy is withdrawn at an inward point tending to cause the fluid to travel spirally. Smaller particles are carried out with the gaseous fluid and coarser particles thrown to the periphery where they are subjected to further reduction. Thus, the grinding chamber also serves as an internal classifier. The outlet from the grinding chamber typically leads directly into a concentric centrifugal collector. This collector receives the material as it is traveling in a high-velocity rotary motion and is conducive to the separation of from about 85 to 95 percent of the pigment from the steam. The steam is removed from the mill, usually in a direction opposite to the direction of the pigment, in the centrifugal collector and carries with it from 5 to 15 percent of the pigment introduced into the mill.

Examples of fluid energy type mills include: the Micronizer mill, which is described in U.S. Pat. Nos. 2,032,827 and 2,219,011, Trost jet mills, Jet-O-Mizers, Reductionizers, Jet Pulverizers, etc. A detailed description of fluid energy type mills, including the Micronizer, the Reductionizers, Jet Pulverizers, etc. A detailed description of fluid energy type mills, including the Micronizer, the Reductionizer and the Eagle mill, appears in *Industrial Engineering Chemistry*, Volume 38, page 672, et seq., (1946). Fluid energy or jet type mills are also described in *Perry's Chemical Engineers Handbook*, Third Edition, John H. Perry, Editor, pages 1145–47, McGraw-Hill Book Company, (1950), New York, and *Chemical Processing*, July 1966, pages 50–64.

The pigment entrained with the gaseous discharge from the fluid energy steam mill is significant and must be recovered to provide a process with favorable economics. One method for recovering such entrained pigment is a wet collection scheme, a schematic of which is shown in FIG. 1. Referring now to the accompanying FIGS., wherein like numbers designate like parts, and particularly to FIG. 1, there is shown fluid energy mill 1 into which pigment is introduced through funnel 13 as indicated by arrow 14. Simultaneously with the introduction of pigment to the mill, steam, usually superheated steam, is also introduced into the mill as indicated by arrow 12. Milled pigment product is removed from mill 1 through valve 2 as indicated by arrow 16, while mill gas discharge, which contains entrained or suspended pigment, is withdrawn from the mill through the principal gas discharge port 10, as indicated by arrow 18 and introduced into condenser 3. In condenser 3, the steam in the mill gas discharge is condensed and the resulting pigment slurry removed to settler 5 as indicated by arrow 20. Typically, the slurry is very dilute, e.g., 4 percent solids. In settler 5, the pigment is permitted to settle to produce a more concentrated slurry with the supernatant water from the settler being discarded as indicated by arrow 22. The now more concentrated slurry is transferred to filter 7 as indicated by arrow 24 wherein excess water is removed. The filter cake is transferred to drier 9 as indicated by arrow 28 and the dried recovered pigment is removed from drier 9 as indicated by arrow 32. Typically, the recovered pigment is returned to the mill as feed, as indicated by broken arrow line 34.

The above-described wet collection system involves additional processing steps requiring substantial capital investment in processing equipment. The aforementioned disadvantages are eliminated by the dry collection system described herein.

It has now been discovered that the pigment entrained with the gas discharge stream from a fluid energy steam mill can be recovered by a dry, as opposed to a wet, collection system. This is accomplished by maintaining the temperature of the gas discharge stream from the mill above its dew point temperature so that conventional dry collection equipment, e.g., bag collectors, can be used to separate entrained pigment from the steam. Such temperature control can be achieved in several ways. For example, the lines and pigment separator (bag collector) are heated and/or insulated to prevent the loss of sensible heat from mill gas discharge stream. Alternatively, air is mixed with the gas discharge from the mill to lower the dew point temperature of this gas stream. The air can be heated or can be at ambient or room temperatures. The use of extremely cold air, which would cause condensation of the steam, is avoided since the object of the method described herein is to avoid steam condensation through pigment separation.

Figure 2:
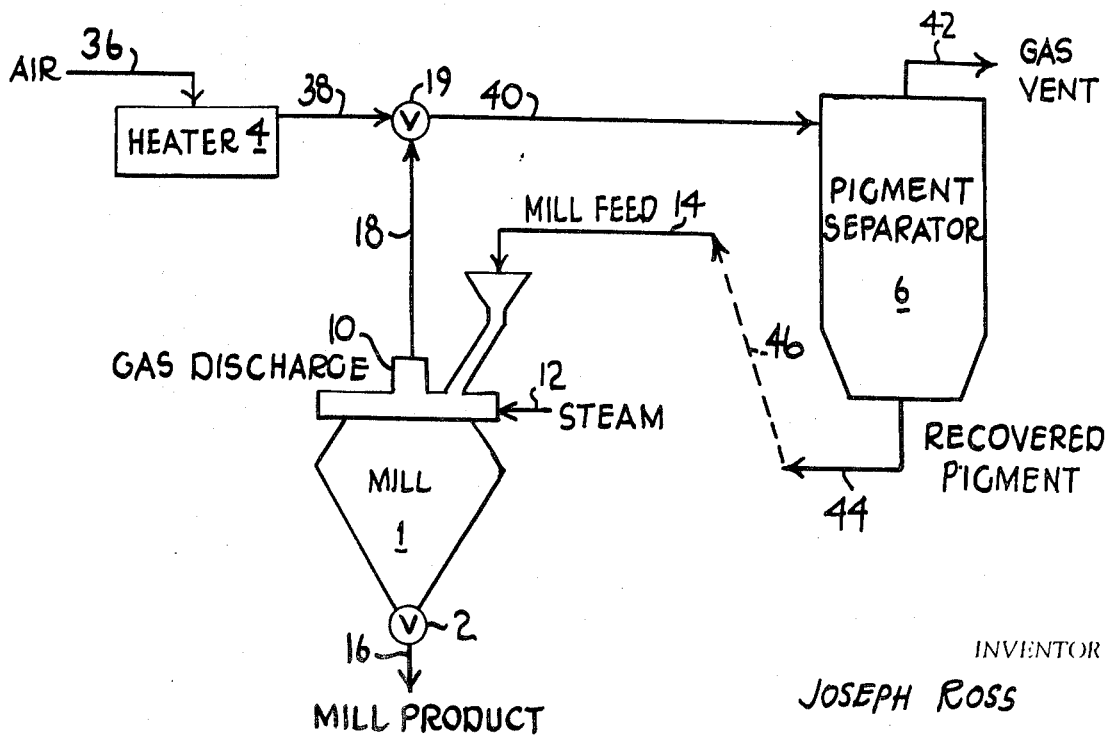
FIG. 2 is a schematic of one preferred embodiment of a dry collection system for recovering pigment entrained in the gas discharge of a fluid energy steam mill.

Referring now to FIG. 2, the gas discharge stream removed from mill 1, as indicated by arrow 18, is admixed with heated gas, e.g., air, from heater 4, as indicated by line 38 at mixing valve 19. The heated gas is obtained by passing air as indicated by arrow 36 through heater 4. The amount and enthalpy of heated gas is precalculated and controlled so that the temperature of the resulting gaseous admixture, indicated by line 40, is maintained above its dew point temperature until and after pigment separation occurs in separator 6. In pigment separator 6, pigment is separated from the entraining gas and withdrawn from separator 6 as indicated by arrow 44. Typically, the recovered pigment is returned to mill as feed, as indicated by broken arrow line 46. However, if the properties of the pigment are satisfactory, it can be combined with the mill product. Pigment-free heated gas and steam is withdrawn from pigment separator 6, as indicated by arrow 42 and, if desired, vented to the atmosphere. The temperature of the gaseous stream withdrawn from separator 6 (line 42) is above its dew point temperature to prevent condensation and rewetting of the pigment within separator 6.

In the embodiment wherein no air is intentionally mixed with the mill gas discharge stream, the conduits conveying the stream (lines 18 and 40) and the pigment separator 6 are insulated and/or heated, e.g., steam traced, to maintain the wall temperatures thereof above the dew point temperature of the stream.

The steam used to supply the grinding energy in the fluid energy mill is typically supplied at pressures of from about 50 to about 350 pounds per square inch gauge and at temperatures up to about 600° F. (160° - 300° F. superheat). Typically, steam at about 150 pounds per square inch gauge and about 550° F. total temperature (180° F. superheat) is used. The intensity of fluid energy steam milling can be expressed in terms of pounds of steam to pounds of pigment fed to the mill. Such intensity typically varies from about 0.25:1 to about 100:1, preferably, between 0.5:1 and about 10:1, more preferably from about 1:1 to about 3:1. Economically, the lowest possible ration of steam to pigment that will accomplish the desired milling is used.

Gas mixed with the gas discharge stream from the mill can be any gas which is chemically compatible with the pigment and noncondensible at the lowest temperature encountered by the mixed stream from the point of admixture through pigment separation. By noncondensible is meant that the boiling point of any liquid component of the gas is less than the lowest temperature to which the pigment is likely to encounter following admixture and during pigment separation. Suitable examples of noncondensible gases that can be employed include nitrogen, air, carbon dioxide, etc. Typically, unprocessed air from the atmosphere is used. However, the air can be filtered, if necessary, to remove particulate contaminants present therein.

The amount and enthalpy of the gas mixed with the mill gas discharge depends on the amount of heat lost from the system, e.g., piping and pigment separator, and the capacity of the mill, and is controlled so that the temperature of the resulting gaseous admixture remains above its dew point temperature through pigment separation. That is, the temperature of the gas stream exiting from separator 6 (line 42) should be above the dew point temperature of the stream. Further, the temperature of the stream conveyed to the pigment separator (with or without added gas) should be sufficiently above its dew point temperature to allow for minor upsets in the process which lower the stream temperature. Typically, the temperature of the stream forwarded to the pigment separator is from about 25° to 40° F. above its dew point temperature.

The amount of gas mixed with the mill gas discharge will also depend on the temperature to which it is heated. Thus, smaller quantities of highly heated gas, as well as larger quantities of slightly heated gas, can be employed to attain the same ultimate dew point temperature. However, the most important criterion used in calculating the amount and temperature of the heated gas used is that sufficient enthalpy and gas volume be added to the mill gas discharge to maintain the dew point temperature of the combined streams sufficiently low so that steam condensation does not occur anywhere in the system. The amount and temperature of mixing gas utilized can be reduced by reducing heat losses from the gas mill discharge stream during transfer to and processing within the pigment separator. Such heat losses can be minimized by insulating transfer lines, steam tracing transfer lines and by insulating or externally heating, e.g., steam tracing, the pigment separator.

The amount of added gas (gas) required to obtain any gas mixture (mixt.) temperature (temp.) can be calculated from the relationship:

$$\frac{\text{Lbs. of gas}}{\text{Lbs. of steam}} = \left(\frac{\text{temp. steam} - \text{temp. mixt.}}{\text{temp. mixt.} - \text{temp. gas}}\right)$$

$$= \left(\frac{\text{Specific heat of steam}}{\text{Specific heat of gas}}\right)$$

The dew point of the gas mixture can be determined from a psychrometric chart and the concentration of water in the mixture resulting from water in the added gas plus the steam. The volumetric rate of added gas can be calculated from the ideal gas law which simplifies to:

$$\frac{\text{Ft.}^3}{\text{hr.}} = \left(\frac{\text{pounds gas}}{\text{pounds steam}}\right)\left(\frac{\text{pounds steam}}{\text{hour}}\right)\left(\frac{0.74}{\text{M.W. gas}}\right)(\text{temp. gas }^\circ\text{R.})$$

The added gas can be heated, if desired, by any suitable readily available heating means such as space heaters, electrical heaters, steam heaters, gas fired furnaces, etc. Typically, temperatures of the added gas will range from about room temperature, 70° F. to 500° F., e.g., about 200° to 400° F.

Any type of conventional equipment utilized for dust collection and suitable for dry pigment separation can be used in the present process. For example, separators utilizing gravitational, inertial, filtration, electrostatic, physiochemical, thermal and sonic forces or mechanisms can be utilized. Particularly contemplated are impingement separators, cyclone separators, centrifugal separators and cloth collectors, also known as bag filters. In a cloth collector, the pigment-laden gas is passed trough a woven fabric which "filters" out the pigment, allowing the gases to pass on and out of the collector. Collectively, such equipment can be referred to as "pigment separation means."

In a typical embodiment, apparatus similar to that illustrated in FIG. 2 is utilized. Initially, air is introduced and heated through heater 4 and passed through the lines connected to pigment separator 6 in order to preheat both the gas transfer lines and the pigment separator to temperatures above the calculated dew point temperature of the process stream. Thereafter, pigment and steam are fed to the mill and gas discharge from the mill admixed with the heated air flowing from heater 4. Since the volume, pigment and steam content and temperature of the gas discharge from the mill, as well as heat losses from the transfer lines and pigment separator, can be precalculated, the required amount and enthalpy of gas mixed with the mill gas discharge can be readily calculated.

The present process is more particularly described in the following examples which are intended as illustrative only since numerous modifications and variations therein will be apparent to those skilled in the art.

EXAMPLE I

Apparatus analogous to that illustrated in FIG. 2 was utilized in the following example.

Atmospheric filtered air heated to a temperature of about 285° F. in heater 4 was passed through the mill gas discharge transfer lines and cloth collector 6 until temperatures of about 230° F. were attained in the system. Thereafter, pigmentary titanium dioxide and superheated steam at a steam to pigment ratio of about 2.6:1, were introduced into fluid energy mill 1. The superheated steam was supplied at a pressure of about 145 pounds per square inch gauge and a total temperature of about 495° F. Gas discharge from the mill having a temperature of about 315° F. was mixed with about 135 cubic feet per hour of said heated atmospheric air per pound of milled pigment and the resulting admixture conveyed to cloth collector 6. Dry titanium dioxide was recovered from the cloth collector 6. Dry titanium dioxide was recovered from the cloth collector while the steam-laden entraining gas was vented to the atmosphere through the gas discharge port of the separator. No steam condensation took place in the transfer lines or cloth collector.

EXAMPLE II

Utilizing apparatus similar to that illustrated in FIG. 2, atmospheric air is heated about 275° F. above its atmospheric temperature and passed through the mill gas discharge transfer lines and cloth collector until the gas discharge temperature from the collector is about 225° F. to 250° F. The transfer lines and cloth collector are steam traced to minimize heat losses. Thereafter, pigmentary titanium dioxide and superheated steam are introduced into the mill in a manner analogous to example I. The heated atmospheric air is shut off after milling is started and the unit is allowed to operate in this manner. Dry titanium dioxide is recovered from the collector. No steam condensation in the transfer lines or cloth collector is observed.

While there is above described a number of specific embodiments of the present invention, it is obviously possible to produce other embodiments and various equivalent modifications thereof without departing from the spirit of the invention.

Having set forth the general nature and specific embodiments of the present invention, the scope thereof is now particularly pointed out in the appended claims.

What is claimed i:

1. In the process of grinding pigmentary titanium dioxide with steam in a fluid energy mill wherein the steam discharged from the mill as the principal fluid energy mill steam discharge stream contains entrained pigment, the improvement which comprises mixing said steam discharge stream with air, conveying the resulting stream to dry pigment separation means, separating e trained pigment from said resulting stream therein and recovering thus separated pigment from said dry pigment separation means, the amount and enthalpy of said air being sufficient to maintain the of said resulting stream above its dew point temperature throughout pigment separation.

2. In the process of milling pigmentary titanium dioxide with steam in a fluid energy mill wherein the steam discharged from the mill as the principal fluid energy mill steam discharge stream contains entrained pigment, the improvement which comprises mixing said steam discharge stream with noncondensible, chemically compatible gas, conveying the resulting stream to dry pigment separation means, separating entrained pigment from said resulting stream therein and recovering thus separated pigment from said pigment separation means, the amount and enthalpy of said compatible gas being sufficient to maintain the temperature of the resulting stream above its dew point temperature until pigment separation is completed.

3. In the process of milling pigmentary titanium dioxide with steam in a fluid energy mill wherein the steam discharged from the mill as the fluid energy mill gas discharge stream contains entrained pigment, the improvement which comprises mixing said gas discharge stream with noncondensible, chemically compatible gas, separating entrained pigment from said resulting stream therein and recovering thus separated pigment from said pigment separation means, the amount and enthalpy of said compatible gas mixed with said gas discharge stream being sufficient to maintain the temperature of the resulting stream above its dew point temperature until pigment separation is completed.

4. The process of claim 2 wherein the pigment separation means is a cloth collector.

5. The process of claim 2 wherein the temperature of the resulting stream is maintained from 25° to 40° F. above its dew point temperature.

6. The process of claim 3 wherein said compatible gas is air.

7. The process of claim 6 wherein said air has a temperature of from about 70° F. to about 500° F.

8. The process of claim 1 wherein said air has a temperature of from 70° F. to 500° F.

9. The process of claim 8 wherein said pigment separation means is a cloth collector.

10. The process of claim 2 wherein said compatible gas has a temperature of from 70° F. to 500° F.

11. The process of claim 3 wherein said pigment separation means is a cloth collector.

* * * * *

PO-1050
(5/69)

UNITED STATES PATENT OFFICE
CERTIFICATE OF CORRECTION

Patent No. 3,622,084                     Dated November 23, 1971

Inventor(s) Joseph Ross

It is certified that error appears in the above-identified patent and that said Letters Patent are hereby corrected as shown below:

In Claim 1, line 57, column 6, after "maintain", insert --the temperature-- which is missing.

In Claim 3, column 7, line 3, after "gas", insert --conveying the resulting stream to dry pigment separation means that has been previously heated to temperatures above the dew point temperature of the resulting stream by further non-condensible, chemically compatible gas,--.

Signed and sealed this 6th day of June 1972.

(SEAL)
Attest:

EDWARD M. FLETCHER, JR.              ROBERT GOTTSCHALK
Attesting Officer                    Commissioner of Patents